United States Patent [19]
Lenfant et al.

[11] 3,724,924
[45] Apr. 3, 1973

[54] MULTIPLE FOCUSING DEVICE

[75] Inventors: Rene Lenfant, 91-Paray-Vieille-Poste; Guy Petitjean, 92-Clamart, both of France

[73] Assignee: Compagnie Generale d'Electricite, Paris, France

[22] Filed: Dec. 23, 1970

[21] Appl. No.: 101,080

Related U.S. Application Data

[63] Continuation-in-part of Ser. No. 886,898, Dec. 22, 1969, abandoned.

[52] U.S. Cl. ................... 350/167, 219/121 L, 350/2, 350/190, 350/205
[51] Int. Cl. .............................................. G02b 27/00
[58] Field of Search .............................. 350/167, 190

[56] References Cited

UNITED STATES PATENTS

| | | |
|---|---|---|
| 3,493,291 | 2/1970 | Webb ........................... 350/167 UX |
| 3,459,111 | 8/1969 | Cooper ........................... 350/167 X |
| 2,981,140 | 4/1961 | Ogle ................................ 350/167 |
| 3,589,880 | 6/1971 | Clark ............................... 350/2 UX |
| 2,501,258 | 3/1950 | Bonnet ........................... 350/167 X |
| 3,178,993 | 4/1965 | Ferris et al. ..................... 350/167 |
| 3,191,495 | 6/1965 | Miller .......................... 350/167 UX |
| 1,755,315 | 4/1930 | Chubb ..................... 350/175 SL UX |
| 3,357,769 | 12/1967 | Thompson ............... 350/175 SL UX |

Primary Examiner—John K. Corbin
Attorney—Craig, Antonelli & Hill

[57] ABSTRACT

A multiple focusing device for radiation made up of a plurality of right prisms each having a corresponding end or base cut and polished to form a spherical cap producing a focal point for the incident radiation, the plurality of prisms being grouped so that the focal points produced thereby fall within a plane transverse to the incident radiation.

8 Claims, 5 Drawing Figures

MULTIPLE FOCUSING DEVICE

This application is a continuation-in-part of U.S. application, Ser. No. 886,898, filed Dec. 22, 1969, now abandoned.

The present invention relates in general to optical devices, and more particularly to a multiple focusing device capable of forming a plurality of beams from a single incident beam.

It is known in the art to break up a beam which consists of radiation of any type or nature into a multitude of beams by means of a plurality of elementary focuses which are regularly or uniformly distributed over the plane surface of a device intercepting a transverse orthogonal section of the beam. A device of this type is used particularly on board satellites for the purpose of studying different radiations in space. It consists of a specific number of spherical caps which are cut off as desired and then polished on the cut-off surfaces thereof and glued onto the plane, also previously polished surface of a crystal, which is made from a substance which is transparent to the radiation to be studied, entirely like the caps themselves.

The entire arrangement thus constitutes a focusing device at the output of which the incident beam is broken up into as many elementary beams as there are spherical caps in the device.

In actual practice, the dimensions of the caps that are employed are relatively small, for example in the order of one millimeter. As a result, the operation of cutting and smoothing the surfaces of these caps as well as the polishing thereof require particular care and techniques which may involve additional, relatively significant expenses depending upon the materials being used.

Such devices do, therefore, have certain drawbacks. First of all, when examining the surface upon which the radiation to be studied must be received, one finds that the respective caps being disposed tangentially with respect to each other allow for the continued presence therebetween of non-used planar surfaces so that, as a result, the radiation energy received by the non-used surfaces in question cannot be focused and this therefore represents loss without any attendant benefits.

Another drawback of the known devices consists in that they comprise at the joint or junction surface between each of the spherical caps and the base crystal a diopter which constitutes an obstacle which the radiation to be studied must pass or overcome, thus providing an additional energy loss. The last-mentioned loss moreover is all the more significant as, in order to assemble the different spherical caps on the base crystal, one has recourse generally to gluing, which necessitates the provision of a layer of adhesive material which is more or less adapted to pass the desired radiation and whose unfavorable influence is added to that of the aforementioned diopter.

It is the primary object of the present invention to obviate the various disadvantages and drawbacks of the prior art devices outlined above and to provide for a multiple focusing device which has a very simple construction.

According to the invention, instead of starting with truncated spherical segments, the initial operation is to cut objectives in the form of small parallelepipeds, preferably right prisms with a square base, in the crystals of an appropriate type, that is to say, transparent to the particular radiation to be investigated, each of said objectives being terminated on one side by a spherical portion which is centered upon the corresponding axis of symmetry of the prism. The diameter of the sphere is preferably of the same length as the diagonal of the square forming the transverse base of the prism.

Other features and advantages of the invention will be best understood from the following description and by reference to the accompanying drawings, the said description and drawings relating to preferred embodiments of the invention, which are given simply by way of illustration and have no limiting character.

Figure 1:
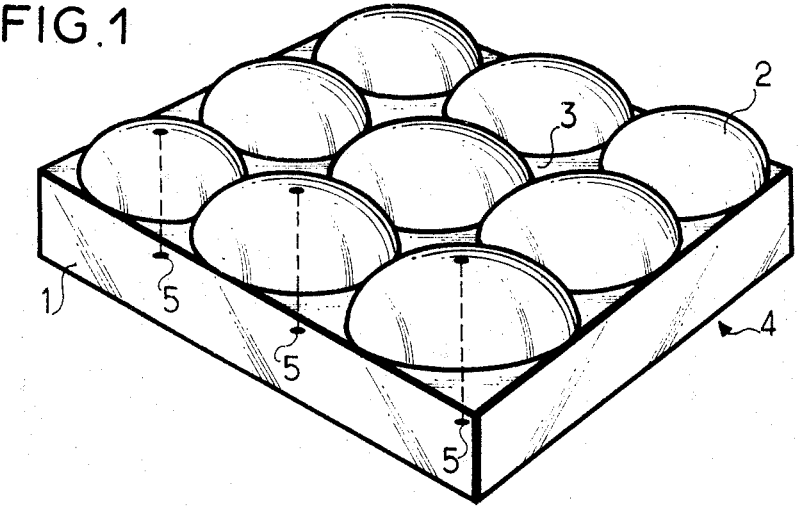
FIG. 1 is a perspective view showing a known focusing device.

Illustrated in FIG. 1 is one of the known focusing devices having a base plate 1 assumed to be cut in a crystal material which is transparent to the radiation to be studied. On the base plate 1 there is provided a plurality of individual spherical caps 2 which are disposed with their flat faces over the input face of the crystal, with the planar surfaces 3 remaining, however, unused between adjacent caps. The elementary focuses 5 are obtained on the output surface 4 of the device as a result of the focusing action on the incident radiation by the individual spherical caps 2; however, the aforementioned drawbacks common to the prior art are inherent in this device.

Figure 2:
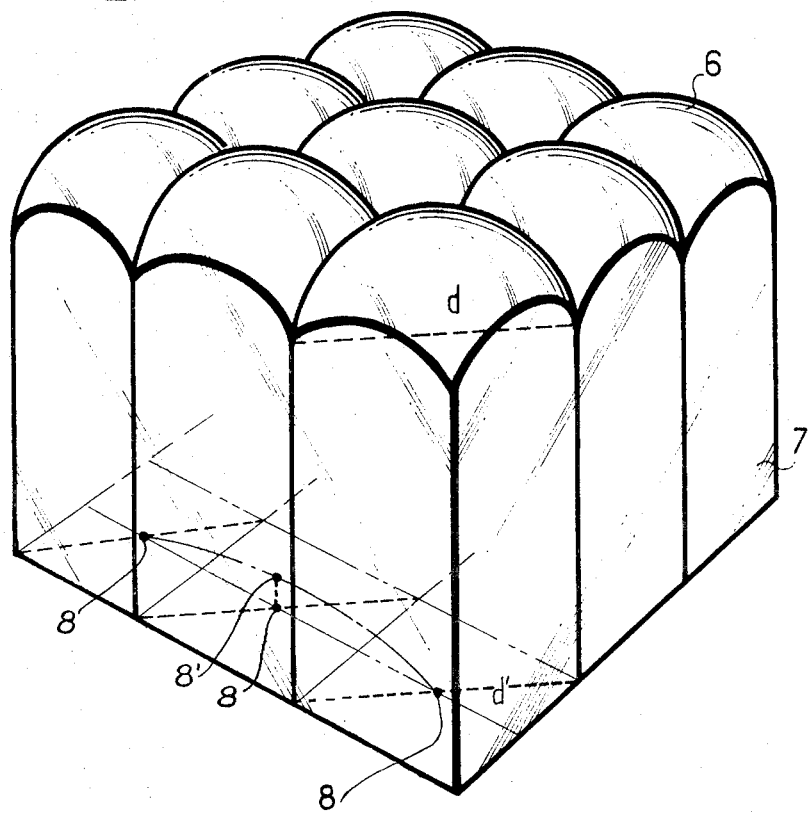
FIG. 2 is a perspective view of a focusing device according to the invention.

Shown in FIG. 2 are the different object lenses in the form of elementary prisms according to the present invention which are disposed adjacent each other, with the edges or end faces of the prisms being oriented in the sense or direction to provide focusing of the rays.

The spherical cap or end 6 of each one of the elementary object lenses 7 according to the present invention is centered with respect to the axis of the prism, and is formed as an integral part thereof, in a manner such that one of the diameters $d$ of the spherical end is equal and parallel to one of the diagonals $d'$ of the base of the prism. Represented at 8 is one of the elementary focuses which is assumed to be formed or constituted on the diagonal $d'$ of each prism 7.

It is clearly apparent that there is every possibility for modifying, if necessary, the dimensions and the provision of the different elementary object lenses 7 so as to form a mosaic which satisfies precise predetermined conditions or requirements and particularly is susceptible to establishing a well defined network wherein all of the elementary focuses are grouped according to a specific order.

The height of each prism is determined in a manner such that, taking into account the particular refractive index of the material which has been chosen with respect to the wave length of the incident radiation, the elementary focuses of the device may be situated in a plane parallel to the base thereof, or, more particularly, in the very same plane of this surface. If need be, the energy being concentrated in each of these focuses may be collected again by means of another optical system (not shown) which may be disposed in series with the first one and whose function it is to treat the radiation which it receives and which is transmitted by this first device.

Accordingly, none of the drawbacks and disadvantages of the prior art devices exist in the arrangement provided in accordance with the present invention. The receiving surface of the device according to the present invention is used completely without any loss of radiation; there is no longer an obstacle to the passage of the radiation through the crystalline mass; and as a result of the construction thereof the rays do not traverse or pass the lateral surfaces of the prisms which are designed only to facilitate the assembly of the prisms with respect to each other, for example by means of gluing. As far as the assembly itself is concerned, it may be suitably reinforced by means of an outer framework, or by a plurality of appropriate belts or straps which will enclose the entire combination of elementary object lenses.

Multiple modifications of the device described hereinabove are conceivable. For example, not only the shape and the dimension of the caps but also those of the prisms themselves may be varies, and these variations may be interdependent, if desired, or by contrast they may be more or less independent of each other.

It may be sought, for example, to achieve a particular distribution of the focusing points on the working surface. One may also seek to no longer distribute these points over a plane surface, but to distribute them over a curved or irregular surface, such as illustrated schematically by the displaced focal point 8' in FIG. 2 in connection with one row of prisms.

One interesting variant of the invention is obtained in the case where it is proposed not to focus at one point, but along a continuous line, with a view to certain well-established applications. With such an object in view, a certain number of elementary prismatic objectives disposed in alignment in the arrangement shown in FIG. 2 is replaced by a single elementary objective which no longer comprises spherical segments as entry face, but a convex cylindrical surface, of which the axis and consequently the generatrices are substantially perpendicular to the direction of the incident light beam. The focal length of the said cylindrical surface is equal to that surface which is common to all the other elements of the initial device. The focal point of the said elementary prism will thus be formed in the common focal plane of the system, in the same way as all the other elementary foci of the device.

Furthermore, it has been considered to be of interest to incorporate in the device according to the invention the improvement which will hereinafter be described.

It was found that the incident rays, having their point of impact in the vicinity of the rims of the entry segments of the elementary prisms, resulted in the formation of reflected rays, certain of which were able, because of their incidence, to penetrate by refraction into the adjoining elementary prism of the system, where they constituted a parasitic radiation capable of reaching the common focal plane and thereby disturbing the anticipated effects.

According to the invention, the lateral faces of the different elementary prisms are coated with an absorbent substance, so that even if a parasitic ray should strike one of these surfaces, it is no longer able to be either reflected or refracted again. Only the useful rays will then be able to converge, as proposed, at the focal point or along the focal line of each of the elementary prisms.

It is also apparent that it would be advantageous to use, as absorbent substance, the adhesive or cement which is used for assembling together the different elementary prisms of the system; for this purpose, it is sufficient to load the said cement with particles which are suitably chosen with the object of absorbing the parasitic rays, for example, carbon particles.

Another improvement is also capable of being added to the basic device according to the invention. It is a question of a means designed to permit the improvement in the optical properties of these different prisms and particularly of suppressing the aberrations thereof. To this end, it is proposed to provide a diaphragm for each of the elementary objectives as described by means of a channel or groove formed on the periphery of the said elements by successively recessing its longitudinal faces so as to form therein a relatively deep groove. The said depth could moreover be made gradually variable, so as to leave, in the corresponding transverse section of the prism, only a substantially circular thickness of crystal, when it is a question of a prism having a square base; in the case of an elongated prism, the solid part would have the form of a rectangle, of which the two small sides would be replaced by two semi-circles of a diameter equal to the small dimension of the said rectangle.

In all cases, the extreme marginal rays will be eliminated and the focusing effect will thus be improved.

In each specific case, it is expedient to define in the best possible manner the dimensions and the exact shape of the diaphragm by determining a mean term between the improvement in the convergence of the beam and the inevitable loss of radiated energy.

Figure 3:
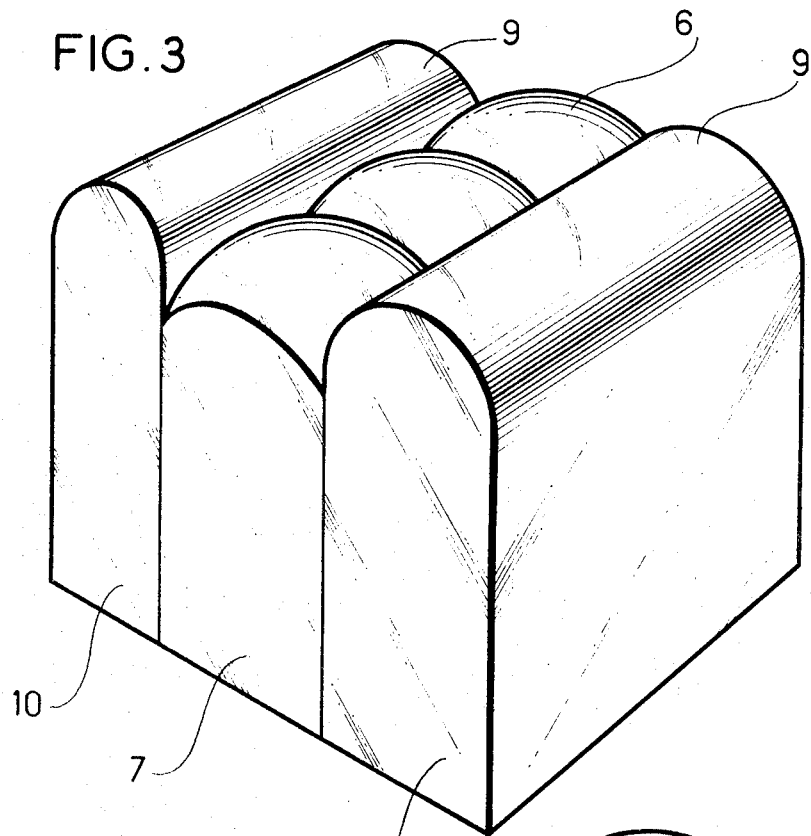
FIG. 3 is a perspective view of another focusing device according to the invention.

Referring to FIG. 3, it is possible to see at 6 one of the spherical entry segments of a prismatic element according to the invention. An entry surface of cylindrical form is shown at 9, in accordance with the variant to which reference has been made above; the corresponding prismatic element 10 replaces along one of the edges of the matrix three prismatic elements having spherical segments, such as 7. A second element 10 has also been shown in symmetrical form, the complete device illustrated being thus composed of five elements altogether; two elements 10, disposed at the two edges of the device, then three elements 7 placed in the middle of the later.

The focusing process will thus result in the formation of an assembly in the common focal plane, which assembly is formed by two focal lines, each due to one of the elements 10, and between these two focal lines, three punctiform foci, each due to one of the elements 7.

Such an assembly is used more particularly in studies in connection with densitometry, for example, in connection with the investigation of remote ultraviolet radiation.

Figure 5:
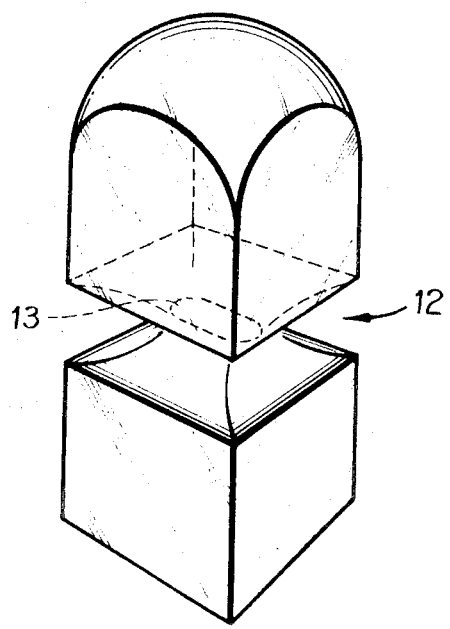
FIG. 5 is a perspective view of an elementary objective according to another embodiment of the invention.
Figure 4:
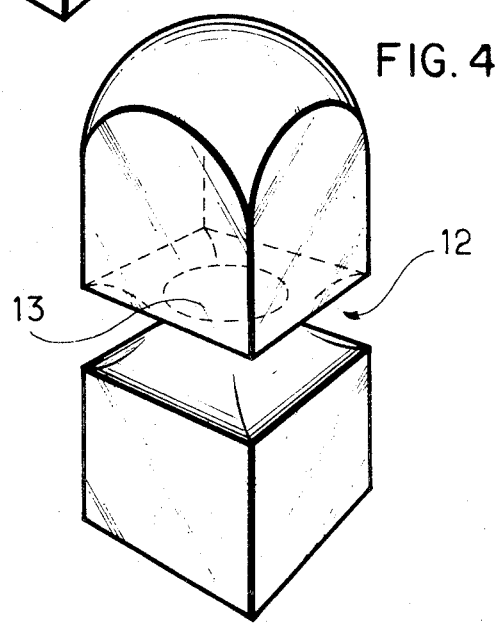
FIG. 4 is a perspective view of an elementary objective according to another embodiment of the invention.

FIG. 4 illustrates one prismatic element with a square base according to the invention, in which element a transverse groove or channel 12 has been formed, so that the preserved central portion of the crystal has a substantially circular form 13 in its smallest section. FIG. 5 illustrates one prismatic element according to the invention, in which element, a transverse groove or channel 14 has been formed, so that the preserved central portion of the crystal has the general form of a rectangle 15, the small sides of which are replaced by semicircles with a diameter equal to the width of the rectangle.

By way of a particular application, a device may be constructed in accordance with one of the modified embodiments of the present invention for the study of distant ultraviolet radiation, this device comprising elementary object lenses cut in monocrystals of magnesium fluoride or lithium fluoride, these two bodies being precisely transparent to the radiation in question which is situated in the region Lyman $\alpha$ ($\lambda = 1216$ A). One obtains thereby images with ultraviolet radiation.

Another specific application of the present invention consists of a device designed for piercing a plate with the aid of a laser beam with a view toward obtaining a multitude of perforations having infinitely small dimensions; namely, for example, in the case where it is desired to render this plate porous or barely transparent; and the precise calibration of the perforations being thus obtained is rendered possible by the very slight dispersion of the radiation in coherent light.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What is claimed is:

1. A multiple focusing device comprising a plurality of elementary object lenses cut in a transparent material, characterized in that each of the elementary object lenses is provided as a prism of geometric cross section one of the bases of which has the shape of a spherical cap having a diameter substantially equal to the diagonal of the cross section of said prism and being centered on the axis of said prism, said prisms being joined by means of the lateral surfaces thereof and each prism having a length at least equal to the focal length of the lens formed by the spherical surface of said one base thereof.

2. A multiple focusing device according to claim 1, characterized in that the prisms are cut in monocrystals of lithium fluoride.

3. A multiple focusing device according to claim 1, characterized in that the focal length of each of the elementary object lenses are such that the focal points thereof are distributed in the form of a curve.

4. A multiple focusing device according to claim 1, characterized in that each of said prisms in a right regular prism.

5. Multiple focusing device according to claim 1, further coming at least one additional elementary object lens formed by a right prism of which the entry face has the form of a convex cylindrical surface with an axis substantially perpendicular to the direction of the incident beam.

6. Multiple focusing device according to claim 5 characterized in that the focal length of the said additional object lens with a cylindrical entry face is equal to that of the other elementary object lenses of the device.

7. Multiple focusing device according to claim 6 characterized in that the said additional elementary object lens has in a transverse plane a size equal to that of at least two of said elementary object lenses having a spherical entry face, these later being aligned along one or other of the axes of the matrix forming the transverse section of the device.

8. Multiple focusing device according to claim 1, characterized in that at least one of the said elementary object lenses has a transverse channel cut in at least one of the lateral faces thereof, the transverse section which remains facing the said groove having the form of a rectangle, of which the two small sides are replaced by semi-circles with a diameter equal to the width of the rectangle.

* * * * *